(12) United States Patent
Black

(10) Patent No.: US 10,937,083 B2
(45) Date of Patent: Mar. 2, 2021

(54) DECENTRALIZED TRADING SYSTEM FOR FAIR ORDERING AND MATCHING OF TRADES RECEIVED AT MULTIPLE NETWORK NODES AND MATCHED BY MULTIPLE NETWORK NODES WITHIN DECENTRALIZED TRADING SYSTEM

(71) Applicant: Medici Ventures, Inc., Midvale, UT (US)

(72) Inventor: Tron Black, Salt Lake City, UT (US)

(73) Assignee: Medici Ventures, Inc., Midvale, UT (US)

( * ) Notice: Subject to any disclaimer, the term of this patent is extended or adjusted under 35 U.S.C. 154(b) by 272 days.

(21) Appl. No.: 16/026,739

(22) Filed: Jul. 3, 2018

(65) Prior Publication Data

US 2019/0005566 A1    Jan. 3, 2019

Related U.S. Application Data

(60) Provisional application No. 62/528,359, filed on Jul. 3, 2017.

(51) Int. Cl.
*G06Q 30/00* (2012.01)
*G06Q 30/06* (2012.01)

(52) U.S. Cl.
CPC ................. *G06Q 30/0633* (2013.01)

(58) Field of Classification Search
CPC ............... G06Q 30/00; G06Q 30/0601; G06Q 30/0623; G06Q 30/0641
See application file for complete search history.

(56) References Cited

U.S. PATENT DOCUMENTS

| 5,077,665 A | 12/1991 | Silverman et al. |
| 5,924,083 A | 7/1999 | Silverman et al. |

(Continued)

FOREIGN PATENT DOCUMENTS

| CN | 102413313 A | 4/2012 |
| CN | 101853190 B | 7/2012 |

(Continued)

OTHER PUBLICATIONS

Fradkin, Andrey. "Search, matching, and the role of digital marketplace design in enabling trade: Evidence from airbnb." Matching, and the Role of Digital Marketplace Design in Enabling Trade: Evidence from Airbnb (Mar. 21, 2017) (2017). (Year: 2017).*

(Continued)

*Primary Examiner* — Christopher B Seibert
(74) *Attorney, Agent, or Firm* — Fogg & Powers LLC

(57) ABSTRACT

A system includes: a plurality of network nodes communicatively coupled in a peer-to-peer network; and a plurality of computing devices each communicatively coupled to at least one of the plurality of network nodes. Computing devices transmit market trade requests to at least one of the network nodes. A first subset of network nodes (including at least two network nodes) determine an order of receipt of the plurality of market trade requests. The first subset of network nodes reach a consensus of the order of receipt of the plurality of market trade requests. The first subset of network nodes generate ordered data based on the order of receipt agreed upon by the first subset of network nodes. A second subset of network nodes (including at least two network nodes) match the plurality of market trade requests.

24 Claims, 8 Drawing Sheets

(56) References Cited

U.S. PATENT DOCUMENTS

| | | | |
|---|---|---|---|
| 6,311,178 B1* | 10/2001 | Bi | G06Q 30/06 707/706 |
| 6,629,082 B1 | 9/2003 | Hambrecht et al. | |
| 7,587,358 B2 | 9/2009 | Hambrecht et al. | |
| 8,055,635 B2 | 11/2011 | Hsu et al. | |
| 8,117,112 B2 | 2/2012 | Hambrecht et al. | |
| 8,204,821 B2 | 6/2012 | Staib et al. | |
| 8,301,880 B2 | 10/2012 | Jennings et al. | |
| 8,498,974 B1* | 7/2013 | Kim | G06F 16/24578 707/706 |
| 8,719,576 B2 | 5/2014 | Buldas et al. | |
| 8,825,971 B1 | 9/2014 | Auchmoody et al. | |
| 9,397,985 B1 | 7/2016 | Seger, II et al. | |
| 9,608,829 B2 | 3/2017 | Spanos et al. | |
| 9,704,143 B2 | 7/2017 | Walker et al. | |
| 10,303,887 B2 | 5/2019 | Black et al. | |
| 2004/0133782 A1 | 7/2004 | Sander et al. | |
| 2005/0114666 A1 | 5/2005 | Sudia | |
| 2005/0166263 A1 | 7/2005 | Nanopoulos et al. | |
| 2006/0129847 A1 | 6/2006 | Pitsos | |
| 2007/0006305 A1 | 1/2007 | Florencio et al. | |
| 2007/0112730 A1* | 5/2007 | Gulli | G06F 16/951 |
| 2007/0174144 A1* | 7/2007 | Borders | G06Q 10/087 705/26.81 |
| 2007/0208598 A1* | 9/2007 | McGrady | G16H 15/00 705/3 |
| 2007/0211651 A1* | 9/2007 | Ahmed | H04L 63/0442 370/256 |
| 2007/0300249 A1 | 12/2007 | Smith et al. | |
| 2008/0028224 A1 | 1/2008 | Pitsos | |
| 2008/0078828 A1* | 4/2008 | Helmin | G06Q 30/06 235/375 |
| 2009/0037491 A1 | 2/2009 | Cachin et al. | |
| 2009/0234848 A1* | 9/2009 | Leff | G06F 16/951 |
| 2010/0031035 A1 | 2/2010 | Princen et al. | |
| 2010/0031039 A1 | 2/2010 | Ciet et al. | |
| 2010/0138281 A1* | 6/2010 | Zhang | G06Q 20/203 705/28 |
| 2010/0161916 A1 | 6/2010 | Thornton et al. | |
| 2010/0169361 A1* | 7/2010 | Chen | G06F 16/36 707/769 |
| 2010/0212017 A1 | 8/2010 | Li et al. | |
| 2011/0099388 A1 | 4/2011 | Hett | |
| 2011/0153848 A1 | 6/2011 | Sakakihara et al. | |
| 2011/0208828 A1 | 8/2011 | Sakakihara et al. | |
| 2012/0209822 A1 | 8/2012 | Prabhakar et al. | |
| 2013/0276058 A1 | 10/2013 | Buldas et al. | |
| 2014/0156671 A1 | 6/2014 | Zhu et al. | |
| 2014/0245020 A1 | 8/2014 | Buldas et al. | |
| 2014/0325644 A1 | 10/2014 | Oberg et al. | |
| 2014/0380425 A1 | 12/2014 | Lockett et al. | |
| 2015/0039893 A1 | 2/2015 | Buldas et al. | |
| 2015/0046466 A1 | 2/2015 | Kaal | |
| 2015/0156026 A1 | 6/2015 | Gault et al. | |
| 2015/0180971 A1* | 6/2015 | Varney | G06F 15/173 709/204 |
| 2015/0188715 A1 | 7/2015 | Castellucci et al. | |
| 2015/0365242 A1 | 12/2015 | Gault et al. | |
| 2015/0370469 A1 | 12/2015 | Leong et al. | |
| 2016/0087798 A1 | 3/2016 | Campbell | |
| 2016/0204942 A1 | 7/2016 | Bohli et al. | |
| 2016/0217436 A1 | 7/2016 | Brama | |
| 2016/0224949 A1 | 8/2016 | Thomas et al. | |
| 2016/0261685 A1 | 9/2016 | Chen et al. | |
| 2016/0261690 A1 | 9/2016 | Ford | |
| 2016/0267474 A1 | 9/2016 | Lingham et al. | |
| 2016/0267566 A1 | 9/2016 | Levitt et al. | |
| 2016/0267605 A1 | 9/2016 | Lingham et al. | |
| 2016/0292672 A1 | 10/2016 | Fay et al. | |
| 2016/0321751 A1 | 11/2016 | Creighton, IV et al. | |
| 2017/0033932 A1 | 2/2017 | Truu et al. | |
| 2017/0075938 A1 | 3/2017 | Black et al. | |
| 2019/0042867 A1 | 2/2019 | Chen et al. | |
| 2019/0278920 A1 | 9/2019 | Black et al. | |
| 2019/0379797 A1 | 12/2019 | Sahagun | |
| 2020/0159891 A1 | 5/2020 | Patel et al. | |

FOREIGN PATENT DOCUMENTS

| | | |
|---|---|---|
| CN | 103218574 A | 7/2013 |
| WO | 2017091530 A1 | 6/2017 |

OTHER PUBLICATIONS

"Linked timestamping", Wikipedia, Feb. 20, 2019, pp. 1-6.

Baird, "The Swirlds Hashgraph Consensus Algorithm: Fair, Fast, Byzantine Fault Tolerance", Swirlds Tech Report Swirlds-TR-2016-01, "http://www.swirlds.com/downloads/SWIRLDS-TR-2016-01.pdf", dated May 31, 2016, Retrieved on Mar. 27, 2018, pp. 1-28.

Bhanot et al, "Distributed Ledgers: Possibilities and Challenges in Capital Markets Applications", "Cognizant 20-20 Insights", "https://www.cognizant.com/whitepapers/distributed-ledgers-possibilities-and-challenges-in-capital-markets-applications-codex1974.pdf", Dated Jun. 1, 2016, Retrieved on Feb. 20, 2018, pp. 1-10, Publisher: COGNIZANT.

BTC Inc, "Overstock Plans to Open Blockchain-Based Stock Exchange to to Other Publicly Traded Companies", "https://distributed.com/news/overstock-plans-to-open-blockchain-based-stock-exchange-t-totother-publicly-traded-companies/", Retrieved on Mar. 27, 2018, pp. 1-6, Publisher: BTC Media.

Del Castillo, "Overstock Raises $10.9 Million in First Blockchain Stock Issuance", "CoinDesk", "https://www.coindesk.com/overstock-first-blockchain-stock-issuance/", Updated Dec. 16, 2016, Retrieved Feb. 20, 2018, pp. 1-5.

Finextra, "Overstock Looks to Issue Bitcoin-Style Stocks", "Finextra", "https://www.finextra.com/newsarticle/27294/overstock-looks-to-issue-bitcoin-style-stocks", Dated Apr. 29, 2015, Retrieved on Feb. 20, 2018, pp. 1-3.

Gassend, et al., "Caches and Merkle Trees for Efficient Memory Authentication", 9th High Performance Computer Architecture Symposium, Sep. 2002, pp. 1-13, Computer Science and Artificial Intelligence Laboratory (CSAIL).

Gondrom et al., "Evidence Record Syntac (ERS)", Standards Track, Aug. 2007, pp. 1-33, Network Working Group.

Guagliardo et al, "Blockchain and Public Securities: Shedding Light on 'Going Dark'", "Power of Intelligence, Insight Center: Publications", "http://www.pepperlaw.com/publications/blockchain-and-public-securities-shedding-light-on-going-dark-2016-09-27/", Dated Sep. 27, 2016, Retrieved on Feb. 20, 2018, pp. 1-3. Publisher: Pepper Hamilton LLC.

International Searching Authority, "International Search Report and Written Opinion from PCT Application No. PCT/US2018/040796 dated Oct. 30, 2018", from Foreign Counterpart to U.S. Appl. No. 16/026,739, filed Oct. 30, 2018, pp. 1-12, Published: WO.

International Bureau, "International Preliminary Report on Patentability from PCT Application No. PCT/US2018/040796", from Foreign Counterpart to U.S. Appl. No. 16/026,739, dated Jan. 16, 2020, pp. 1-9, Published: WO.

Marcogliese et al, "Bitcoins and Blockchain—The Use of Distributed Ledger Technology for the Issuance of Digital Securities", "Cleary M & A and Corporate Governance Watch, Mergers and Acquisitions, Corporate Governance, Shareholder Activism", "Posted in SEC Guidance", "https://www.clearymawatch.com/2016/01/bitcoins-and-blockchain-the-use-of-distributed-ledger-technology-for-the-issuance-of-digital-securities/", Dated Jan. 4, 2016, Retrieved on Feb. 20, 2018, pp. 1-7. Publisher: Cleary Gottlieb Steen & Hamilton LLP.

Metz, "SEC Approves Plan to Issue Stock Via Bitcoin's Blockchain", "Wired, Business", "https://www.wired.com/2015/12/sec-approves-plan-to-issue-company-stock-via-the-bitcoin-blockchain/", Dated Dec. 15, 2016, Retrieved on Mar. 27, 2018, pp. 1-7.

Naik, "Optimising the SHA256 Hashing Algorithm for Faster and More Effecient Bitcoin Mining", Department of Computer Science, Sep. 2, 2013, pp. 1-65, University College London.

(56) References Cited

OTHER PUBLICATIONS

Nitchman, "First Public Offering Using Blockchain Planned", "XBRL", "https://www.xbrl.org/first-public-offering-using-blockchain-planned/", Posted on Mar. 18, 2016, Retrieved on Feb. 20, 2018, pp. 1-3, Publisher: XBRL International Inc.

Prisco, "Overstock Files Crypto Stock Exchange Prospectus with the SEC", "Bitcoin Magazine", "https://bitcoinmagazine.com/articles/overstock-files-crypto-stock-exchange-prospectus-sec-1430258150/", Dated Apr. 28, 2015, Retrieved on Feb. 20, 2018, pp. 1-5.

Richards, "Wall Street Left Out in Overstock's US $500M Stocks Issue", "CoinTelegraph", "https://cointelegraph.com/news/wall-street-left-out-in-overstocks-us500m-stocks-issue", Dated Apr. 28, 2015, Retrieved on Feb. 20, 2018, pp. 1-4, Publisher: Cointelegraph.

Sammantics, "A New Approach to Consensus: Swirlds HashGraph", "http://sammantics.com/blog/2016/7/27/hashgraph-consensus", Jul. 29, 2016, Dated Jul. 29, 2016, Retrieved Mar. 27, 2018, pp. 1-28.

Vakta et al., "Blockchain Disruption in Security Issuance", "CAPGEMINI", "https://www.capgemini.com/wp-content/uploads/2017/07/blockchain_securities_issuance_v6_web.pdf", Dated Jul. 12, 2017, Retrieved Mar. 27, 2018, pp. 1-16.

Van Eyk, "Overstock.com Seeks to Build New Stock Market", "Bitcoin Magazine", "https://bitcoinmagazine.com/articles/overstock-com-seeks-build-new-stock-market-1412623808/", Dated Oct. 6, 2014, Retrieved on Feb. 20, 2018, pp. 1-5.

Zacks, "MasterCard (MA) Files for Blockchain Patents, Introduces AI", "Zacks Equity Research", "https://www.yahoo.com/news/mastercard-ma-files-blockchain-patents-151203016.html", Dated Dec. 1, 2016, Retrieved on Feb. 20, 2018, pp. 1-8.

* cited by examiner

DECENTRALIZED TRADING SYSTEM FOR FAIR ORDERING AND MATCHING OF TRADES RECEIVED AT MULTIPLE NETWORK NODES AND MATCHED BY MULTIPLE NETWORK NODES WITHIN DECENTRALIZED TRADING SYSTEM

CROSS-REFERENCE TO RELATED APPLICATIONS

This application claims the benefit of U.S. Provisional Patent Application Ser. No. 62/528,359 filed on Jul. 3, 2017, entitled "DECENTRALIZED TRADING SYSTEM FOR FAIR ORDERING AND MATCHING OF TRADES RECEIVED AT MULTIPLE NETWORK NODES AND MATCHED BY MULTIPLE NETWORK NODES WITHIN DECENTRALIZED TRADING SYSTEM", which is hereby incorporated herein by reference.

This application is related to U.S. patent application Ser. No. 14/852,955 entitled "DATA VERIFICATION METHODS AND SYSTEMS USING A HASH TREE, SUCH AS A TIME-CENTRIC MERKLE HASH TREE" filed on Sep. 14, 2015 (hereinafter the '955 Application), which is hereby incorporated herein by reference.

BACKGROUND

Markets and exchanges can be used to trade stocks, currencies, bonds, commodities, etc. between buyers and sellers.

SUMMARY

A system includes: a plurality of network nodes communicatively coupled in a peer-to-peer network; and a plurality of computing devices each communicatively coupled to at least one of the plurality of network nodes. Computing devices transmit market trade requests to at least one of the network nodes. A first subset of network nodes (including at least two network nodes) determine an order of receipt of the plurality of market trade requests. The first subset of network nodes reach a consensus of the order of receipt of the plurality of market trade requests. The first subset of network nodes generate ordered data based on the order of receipt agreed upon by the first subset of network nodes. A second subset of network nodes (including at least two network nodes) match the plurality of market trade requests.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
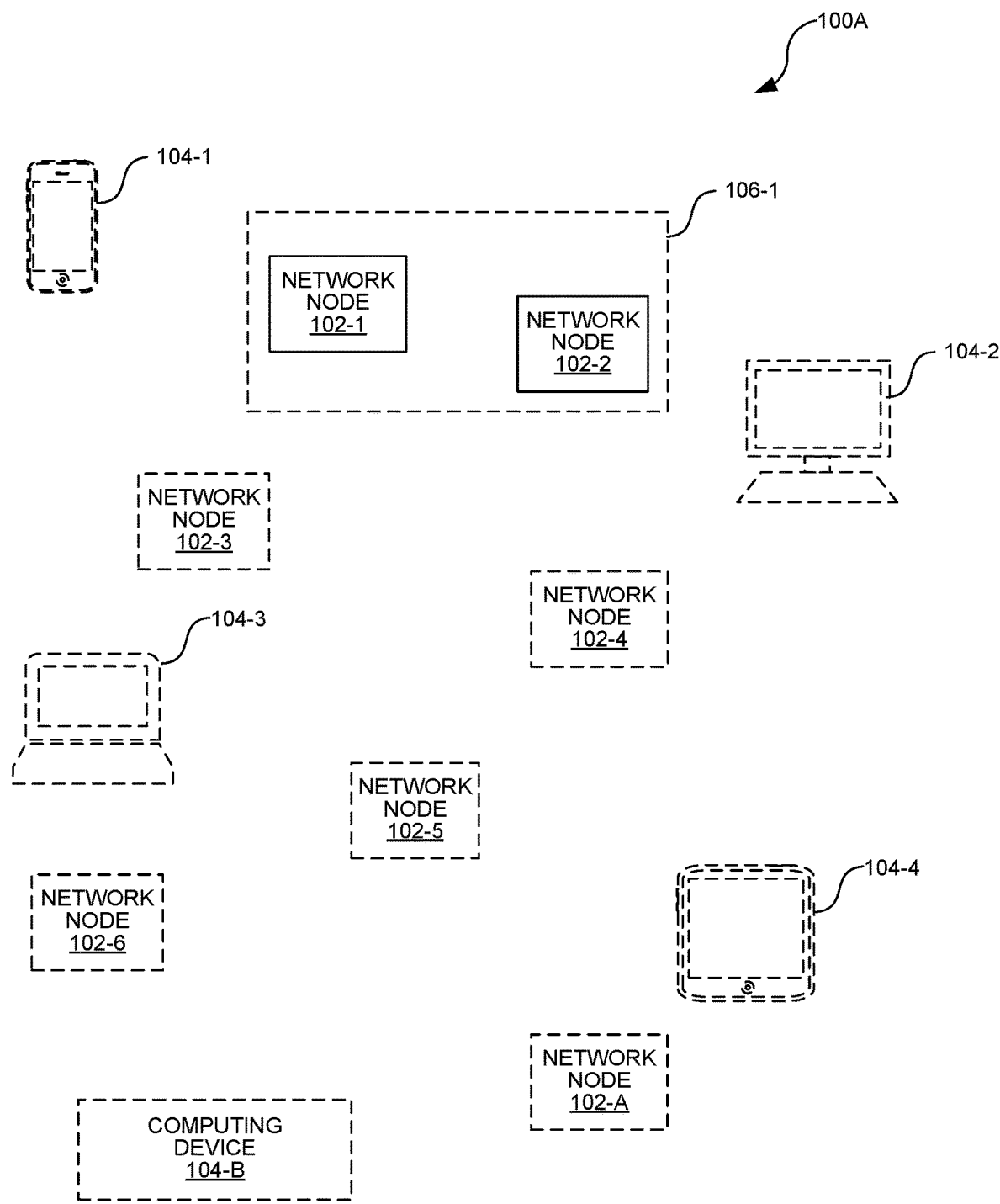
FIGS. 1A-1C are block diagrams of exemplary embodiments of a decentralized trading system for fair ordering and matching of trades received at multiple network nodes and matched by multiple network nodes.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A distributed ledger is an electronic ledger that is distributed across multiple interconnected network nodes, where more than one of the network nodes stores a copy of the ledger. In some embodiments, distributed ledgers implement blockchains to validate the data stored within the distributed ledger.

A blockchain is a verifiable permanent ledger constructed one block at a time with a proof-of-work seal (such as a hash) affixed to each block that validates that block. In any blockchain, the hash of the previous block is included in the current block, and therefore by recursion the current hash also validates all previous blocks back to the original genesis block. Inserting a hash into a blockchain permanently records that hash and acts as a notary verifying proof-of-existence of the hashed data at the moment in time that block is added to the chain. Any future blocks with additional proof-of-work add a layer of protection from a chain re-org and therefore additional certainty that no changes can be made to blocks earlier in the chain.

Timestamps can be based on any useful unit of time, such as but not limited to a nanosecond, a microsecond, a millisecond, another fraction of a second, a second, a minute, an hour, a day, a week, a month, a year, a decade, a century, and a millennium. In other embodiments, timestamps are based on other arbitrary units of time. In exemplary embodiments, dates for timestamps include a Julian or date string with a time-zone (such as GMT as default). In exemplary embodiments, timestamps are specified in nanoseconds, microseconds, or milliseconds. In exemplary embodiments, a Merkle tree is used to store timestamps at different hierarchal levels. In exemplary embodiments, the natural breaks in time are used for the different hierarchal levels of the Merkle tree, such as 60 seconds per minute, 60 minutes per hour, 24 hours per day, and 7 days per week to determine the tree structure of the Merkle Tree.

In exemplary embodiments, a plurality of timestamps at different hierarchal levels of time (such as second, minute, hour, day, week, month, year, etc.) can be created such as the Time Ordered Merkle Tree Epoch (TOME) described in the '955 Application incorporated by reference above. In exemplary embodiments implementing TOME, timestamps (which can be referred to as "tomestamps") at higher hierarchal levels are based on timestamps from a lower hierarchal level. In exemplary embodiments, a unit for a higher hierarchal level includes an epoch for a lower hierarchal level.

It is impractical to record rapidly changing data, such as every trade on a market/exchange, in a blockchain for at least two reasons. First, the amount of data that would need to be synchronized and stored currently exceeds most communication channels and most storage systems and certainly the "bandwidth" of current blockchains. It is simply too much data to synchronize quickly across a widely distributed/decentralized system. Second, it is impractical to record every trade because the timing of a decentralized blockchain is not deterministic as pathways for the data are dependent on the peer-to-peer connections with different delays. This may lead to trade data being recorded in a different order than it originally occurred. This is particularly problematic in systems where precise timing is important for fairness, such as with markets/exchanges.

Buy, sell, and hold orders (and any other applicable orders) are matched by matching engines for exchanges/markets based at least in part on when the orders are made. In some embodiments, the matching occurs based on other criteria in addition to the time the order is made, such as minimum thresholds for buy and/or sell orders, etc. In traditional centralized trading systems, a single entity receives all the trades and can more easily order them. In a decentralized trading system, a fair way of ordering trades that come in from various network nodes is desired to provide fairness during matching. This becomes particularly important when network nodes are distributed over large areas with larger differences in propagation delays and other delays of signals within the decentralized trading system.

In exemplary embodiments, the network nodes can work together to reach a consensus on the order of market trade requests (orders) received at the various network nodes within the system. In exemplary embodiments, the network nodes can then generate ordered data and verify the ordered data between one another. The ordered data can then be used by matching engines at a plurality of network nodes within the network to execute the trade requests in a single order consistent for each of the plurality of network nodes running the matching engine. In some implementations, a first subset of the network nodes are used to reach consensus on the order of the market trade requests and a second subset of the network nodes implement matching engines. In some implementations, the first subset of network nodes is the same as the second subset of network nodes. In other implementations, the first subset of network nodes overlaps partially with the second subset of network nodes. In other implementations, the first subset of network nodes is mutually exclusive from the second subset of network nodes.

Figure 1B:
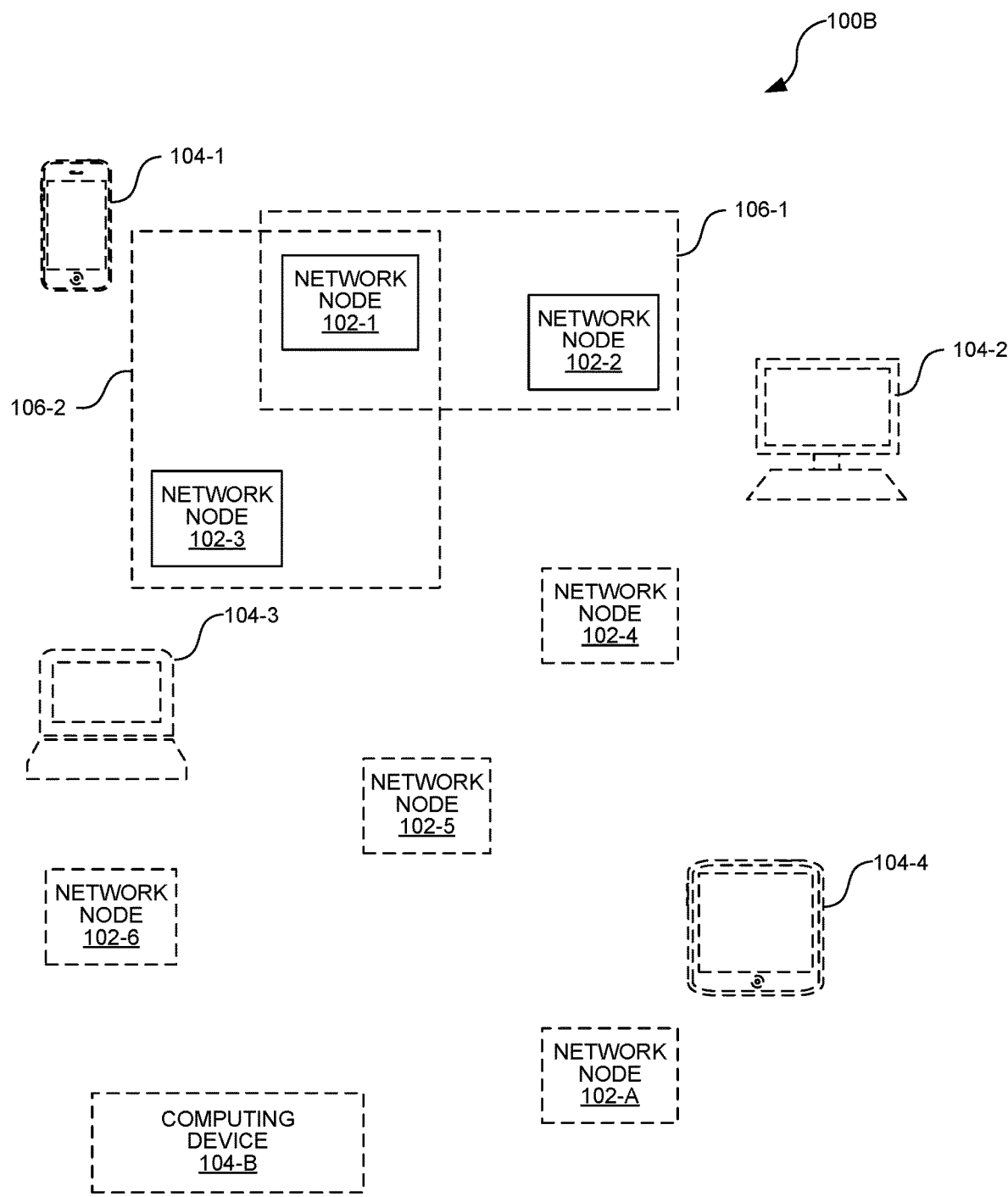
Figure 1C:
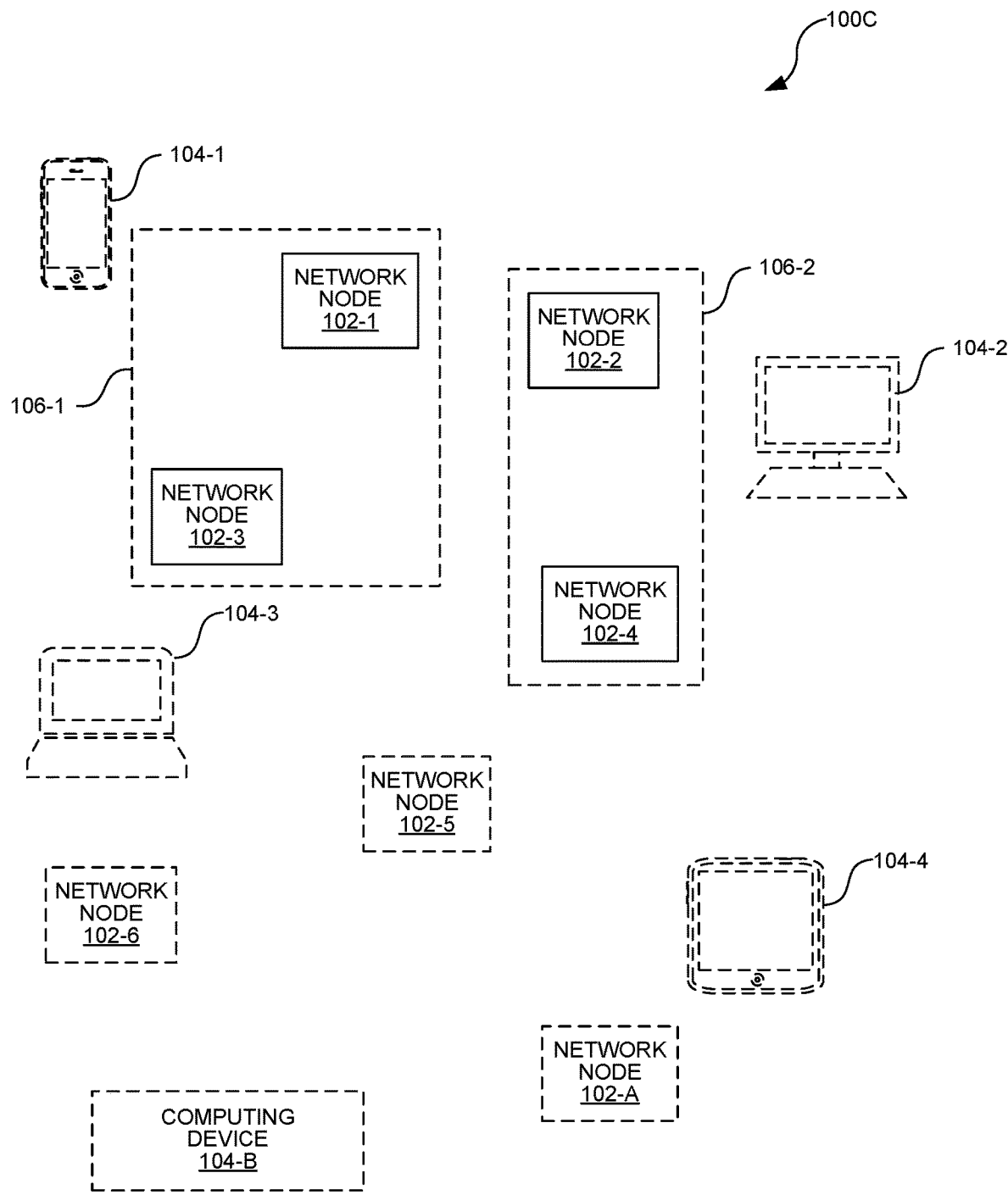

FIGS. 1A-1C are block diagrams of exemplary embodiments of a decentralized trading system 100 for fair ordering and matching of trades received at multiple network nodes 102 and matched by multiple network nodes 102. Each of FIGS. 1A-1C illustrates a different embodiments of a decentralized trading system 100, labeled decentralized trading system 100A-100C respectively.

FIG. 1A is a block diagram of an exemplary embodiment of a decentralized trading system 100A for fair ordering and matching of trades received at multiple network nodes 102 and matched by multiple network nodes 102. Decentralized trading system 100A includes a plurality of network nodes 102 (such as network node 102-1, network node 102-2, and any quantity of optional network nodes 102 such as optional network node 102-3 through optional network node 102-A) and a plurality of computing devices 104 (such as any of computing device 104-1 through computing device 104-B). In exemplary embodiments, the plurality of network nodes 102 are communicatively coupled to each other in a peer-to-peer network. In exemplary embodiments, the network nodes 102 are communicatively coupled using at least one wired network and/or at least one wireless network. In exemplary embodiments, any combination of wired and wireless networks is used to couple the network nodes 102 together. In exemplary embodiments, the network nodes 102 are communicatively coupled over at least one of at least one local area network (LAN), at least one wide area network (WAN), or the Internet. In exemplary embodiments, any combination of local area networks, wide area networks, and the Internet is used to couple the network nodes 102 together.

In exemplary embodiments, the plurality of computing devices 104 are each communicatively coupled to at least one network node 102 of the plurality of network nodes 102. In exemplary embodiments, each computing device 104 is communicatively coupled to at least one of the plurality of network nodes 102 using at least one wired network and/or at least one wireless network. In exemplary embodiments, any combination of wired and wireless networks is used to couple each computing device 104 to at least one network node 102. In exemplary embodiments, each computing device 104 is communicatively coupled to at least one network node 102 over at least one of at least one local area network (LAN), at least one wide area network (WAN), or the Internet. In exemplary embodiments, any quantity of intermediary devices are positioned in the communication path between a computing device 104 and a network node 102 to which it is communicatively coupled, where the intermediary device perform forwarding, relay, and/or routing of messages between the computing device 104 and the network node 102. In exemplary embodiments, any combination of local area networks, wide area networks, and the Internet is used to couple at least one computing device 104 to at least one network node 102. A network node 102 can be communicatively coupled to a plurality of computing device 104. Similarly, a single computing device 104 can be communicatively coupled to a plurality of network nodes 102.

In exemplary embodiments, the network nodes 102 and/or computing devices 104 can be any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. In exemplary embodiments, each computing device 104 can have similar components to exemplary network nodes 102A-102C shown in FIGS. 2A-2C and described below. In exemplary embodiments, each computing device 104 includes at least one memory, at least one processor, at least one optional display device, at least one optional input device, at least one optional network interface, and at least one power source.

In exemplary embodiments, the computing device 104 is configured to receive a request to initiate at least one market trade request (order) from a user. The market trade request can be to trade any assets, including but not limited to, securities, bonds, currencies, funds (such as exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds), and/or other assets. In exemplary embodiments, the market trade request includes at least one of a buy, sell, and/or hold order. In exemplary embodiments, the at least one optional input device and the at least one optional display device are used by a user to create the request to initiate the at least one market trade request. In exemplary embodiments (such as where market timing is important to the user), each market trade request can be sent immediately from a computing device 104 to at least one network node 102 within the decentralized trading system 100. In exemplary embodiments, market trade requests can be sent in batches from a computing device 104 to at least one network node 102 within the decentralized trading system 100.

In exemplary embodiments, each computing device of the plurality of computing devices 104 (including at least two computing devices 104) is configured to transmit a market trade request to at least one of the plurality of network nodes 102. In exemplary embodiments, a first market trade request comes from a first computing device 104 and a second market trade request comes from a second computing device 104. In exemplary embodiments, only some of the network nodes 102 are configured to receive market trade requests. In exemplary embodiments, some network nodes 102 are configured to receive market trade requests, some network nodes 102 are configured to order the market trade requests, and some network nodes 102 are configured to match the market trade requests.

In exemplary embodiments, network nodes 102 can perform more than one of the receiving, ordering, and/or matching functions. In exemplary embodiments, only a subset of the network nodes 102 are configured to receive market trade requests. In other embodiments, all of the network nodes 102 are configured to receive market trade requests. In exemplary embodiments, network node 102-1 and network node 102-2 receive different market trade requests. In exemplary embodiments, the network node 102-1 receives a market trade request from a first computing device 104 at a first moment in time and the network nodes 102-2 receives a market trade request from a second computing device at a second moment in time. While only two market trade requests are discussed for simplicity, it is understood that any quantity of market trade requests can be received at any quantity of network nodes 102 within the decentralized trading system 100 from any quantity of computing devices 104.

In exemplary embodiments, a first subset 106-1 of network nodes 102 (including two or more network nodes 102, such as the first network node 102-1 and the second network node 102-2) are each configured to determine an order of receipt of the plurality of market trade requests received from the plurality of computing devices 104. In exemplary embodiments, the first subset 106-1 of network nodes 102 is configured to reach a consensus of the order of receipt of the plurality of market trade requests. In exemplary embodiments, the first subset 106-1 of network nodes 102 are each configured to generate ordered data based on the order of receipt agreed upon by the first subset of network nodes. In exemplary embodiments, network nodes 102 within the first subset 106-1 of network nodes reach a consensus as to whether the first moment in time or the second moment in time was first. In exemplary embodiments, the network nodes 102 reach consensus through an asynchronous and non-deterministic methodology. In exemplary embodiments, the first network node 102-1 and the second network node (and any other optional network nodes 102 within the network) gossip (such as by broadcast, simulcast, etc.) with one another to ensure the market trade requests received are provided to the optional network nodes 102 that are participating in the consensus ordering. In exemplary embodiments, the first network nodes 102-1 and the second network node 102-2 (and any other optional network nodes 102 participating in the consensus ordering) generate consensus timestamps indicating the order of market trade requests (and other events).

In exemplary embodiments, consensus as to the ordering of the market trade requests (or other events) can be reached without proof of work and can instead use proof of stake. In exemplary embodiments, any network node 102 that is a member of the decentralized trading system 100 can create an event within the consensus network at any time. In exemplary embodiments, a network node 102 that receives a market trade requests from another network node 102, then passes the newly acquired market trade request to other network nodes 102. Accordingly, the network nodes 102 of the decentralized trading system 100 participating in the consensus ordering can distribute (gossip) about information relating to the time at which particular market trade requests (or other events) occur on a common time base throughout any network nodes of the decentralized trading system 100 participating in consensus ordering. Accordingly, each network node 102 participating in consensus ordering can establish a common ordering of the market trade requests independently that matches the order of the market trade requests established by the other network nodes 102 participating in the consensus ordering. In exemplary embodiments, a gossip protocol is used to share information between network nodes 102 of the decentralized trading system 100 participating in consensus ordering at an exponentially fast rate as each network node 102 communicates (gossips) its information about the market trade requests (or other events) immediately after receiving information from a computing device or another network node 102. In exemplary embodiments, intermediary network nodes 102 or other devices participate in the gossip to quickly communicate information about the market trade requests (or other events), even though they are not ordering the market trade requests (or other events). In exemplary embodiments, network nodes 102 participating in ordering the market trade requests (or other events) are separated by at least one network, such as a local area network (LAN), wide area network (WAN), and/or the Internet. In exemplary embodiments, the network nodes 102 participating in ordering the market trade requests (or other events) are geographically spread throughout a particular area, such as a municipality, county, country, continent, hemisphere, or planet. In exemplary embodiments, the network nodes 102 participating in ordering the market trade requests (or other events) are owned and/or operated by a plurality of different individuals and/or entities. The network nodes 102 participating in ordering the market trade requests can work together to reach a consensus on the order of market trade requests (orders) received at the various network nodes within the system. In exemplary embodiments, the network nodes 102 participating in ordering the market trade requests can then generate ordered data and verify the ordered data with the other network nodes 102 participating in the ordering the market trade request.

In exemplary embodiments, the consensus network is a Hashgraph as described in the May 31, 2016 Swirlds Tech Report by Leemon Baird entitled "THE SWIRLDS HASHGRAPH CONSENSUS ALGORITHM: FAIR, FAST, BYZANTINE FAULT TOLERANCE" (available at http://www.swirlds.com/downloads/SWIRLDS-TR-2016-01.pdf), which is incorporated herein by reference.

Timestamps can be based on any useful unit of time, such as but not limited to a nanosecond, a microsecond, a millisecond, another fraction of a second, a second, a minute, an hour, a day, a week, a month, a year, a decade, a century, and a millennium. In other embodiments, timestamps are based on other arbitrary units of time. In exemplary embodiments, dates for timestamps include a Julian or date string with a time-zone (such as GMT as default). In exemplary embodiments, timestamps are specified in nanoseconds, microseconds, or milliseconds. In exemplary embodiments, a Merkle tree is used to store timestamps at different hierarchal levels. In exemplary embodiments, the natural breaks in time are used for the different hierarchal levels of the Merkle tree, such as 60 seconds per minute, 60 minutes per hour, 24 hours per day, and 7 days per week to determine the tree structure of the Merkle Tree.

In exemplary embodiments, a plurality of timestamps at different hierarchal levels of time (such as second, minute, hour, day, week, month, year, etc.) can be created such as the Time Ordered Merkle Tree Epoch (TOME) described in the '955 Application incorporated by reference above. In exemplary embodiments implementing TOME, timestamps (which can be referred to as "tomestamps") at higher hierarchal levels are based on timestamps from a lower hierarchal level. In exemplary embodiments, a unit for a higher hierarchal level includes an epoch for a lower hierarchal level.

In exemplary embodiments, a commit needs to be specified at the end of each epoch boundary (such as the end of a second, the end of a minutes, etc.). In exemplary embodiments, the database stores a hash of the TOME at the time specified and locks the data, so that no more data can be added once committed. In exemplary embodiments, the system will combine all the hashes necessary for second, minute, hour, day, week, etc. when you commit with a timestamp (such as a tomestamp), it will combine all the hashes up to that point. In exemplary embodiments, the hashes are Secure Hash Algorithm 256 (SHA-256) hashes, though other types of hashes can also be used. In exemplary embodiments, the hashes are 64 hex characters (stored as a String). In exemplary embodiments, storage is optimized by storing a 32 byte binary hash based on concatenated hashes at a particular hierarchal level. In exemplary embodiments, the concatenated hashes each have 64 hex characters (stored as a String). In exemplary embodiments, hashes of the timestamps (including timestamps at different hierarchal levels) can be stored (anchored) in a blockchain for data verification purposes.

Timestamps can be based on any useful unit of time, such as but not limited to a fraction of a second, a second, a minute, an hour, a day, a week, a month, a year, a decade, a century, and a millennium. In other embodiments, timestamps are based on other arbitrary units of time. In exemplary embodiments, a plurality of timestamps at different hierarchal levels of time (such as second, minutes, hour, day, month, year, etc.) can be created. In exemplary embodiments, hashes of the timestamps (including timestamps at different hierarchal levels) can be stored in a blockchain for data verification purposes.

Timestamps can be based on any useful unit of time, such as but not limited to a fraction of a second, a second, a minute, an hour, a day, a week, a month, a year, a decade, a century, and a millennium. In other embodiments, timestamps are based on other arbitrary units of time. In exemplary embodiments, a plurality of timestamps at different hierarchal levels of time (such as second, minutes, hour, day, month, year, etc.) can be created. In exemplary embodiments, hashes of the timestamps (including timestamps at different hierarchal levels) can be stored in a blockchain for data verification purposes.

The ordered data can then be used by matching engines at a plurality of network nodes within the network to execute the trade requests in a single order consistent for each of the plurality of network nodes running the matching engine. In some implementations, a first subset of the network nodes are used to reach consensus on the order of the market trade requests and a second subset of the network nodes implement matching engines. In some implementations, the first subset of network nodes is the same as the second subset of network nodes. In other implementations, the first subset of network nodes overlaps partially with the second subset of network nodes. In other implementations, the first subset of network nodes is mutually exclusive from the second subset of network nodes.

In exemplary embodiments, a second subset of network nodes 102 are configured to match the plurality of market trade requests, wherein the second subset of network nodes 102 includes at least two of the plurality of network nodes 102. In exemplary embodiments, the second subset of network nodes 102 is identical to the first subset 106-1 of network nodes (second subset 106-1). In exemplary embodiments, the second subset of network nodes 102 includes a partial overlap with the first subset 106-1 of network nodes 102, such as with second subset 106-2 of network nodes 102 shown in FIG. 1B (which includes network node 102-1 and network node 102-3). In exemplary embodiments, such as shown in FIG. 1C, the second subset 106-2 of network nodes 102 (which includes network node 102-2 and network node 102-4) is mutually exclusive from the first subset 106-1 of network nodes 102 (which includes network node 102-1 and network nodes 102-3). In exemplary embodiments, any quantities of network nodes 102 can be included in the first subset 106-1 of network nodes 102 and the second subset 106-2 of network nodes 102 combined in any configuration of overlapping and/or mutually exclusive network nodes 102. In exemplary embodiments, the second subset 106-2 of network nodes 102 used in the matching of the plurality of trade requests is a subset of the first subset 106-1 of network nodes 102 used in determining the order of receipt of the plurality of market trade requests. In exemplary embodiments, the first subset 106-1 of network nodes 102 used in determining the order of receipt of the plurality of market trade request is a subset of the second subset 106-2 of network nodes 102 used in matching the plurality of trade requests.

FIG. 1B is a block diagram of an exemplary embodiment of a decentralized trading system 100B for fair ordering and matching of trades received at multiple network nodes 102 and matched by multiple network nodes 102. Decentralized trading system 100B includes a plurality of network nodes 102 (such as network node 102-1, network node 102-2, and any quantity of optional network nodes 102 such as optional network node 102-3 through optional network node 102-A) and a plurality of computing devices 104 (such as any of computing device 104-1 through computing device 104-B). In exemplary embodiments, the plurality of network nodes 102 are communicatively coupled to each other in a peer-to-peer network. In exemplary embodiments, the plurality of computing devices 104 are each communicatively coupled to at least one of the plurality of network nodes 102. In exemplary embodiments, a first subset of computing device 104 are each configured to transmit a market trade request to at least one of the plurality of network nodes 102. In exemplary embodiments, the plurality of computing devices 104 includes at least two of the plurality of computing devices, such that a first market trade request comes from a first computing device 104 and a second market trade request comes from a second computing device.

Decentralized trading system 100B includes similar components to decentralized trading system 100A and operates according to similar principles and methods as decentralized trading system 100A described above. The differences between decentralized trading system 100B and decentralized trading system 100A are that the second subset of network nodes 102 includes a partial overlap with the first subset 106-1 of network nodes 102, rather than the second subset of network nodes 102 being identical to the first subset 106-1 of network nodes (second subset 106-1) as with decentralized trading system 100A. In exemplary embodiments, the first subset 106-1 of network nodes 102 are each configured to determine an order of receipt of the plurality of market trade requests received from the plurality of computing devices 104. In exemplary embodiments, the first subset 106-1 of network nodes 102 (including at least two of the plurality of network nodes) is configured to reach a consensus of the order of receipt of the plurality of market trade requests. In exemplary embodiments, the first subset 106-1 of network nodes 102 are each configured to generate ordered data based on the order of receipt agreed upon by the first subset of network nodes. In exemplary embodiments, the second subset 106-2 of network nodes 102 (including at least two of the plurality of nodes) are configured to match the plurality of market trade requests.

FIG. 1C is a block diagram of an exemplary embodiment of a decentralized trading system 100C for fair ordering and matching of trades received at multiple network nodes 102 and matched by multiple network nodes 102. Decentralized trading system 100C includes a plurality of network nodes 102 (such as network node 102-1, network node 102-2, and any quantity of optional network nodes 102 such as optional network node 102-3 through optional network node 102-A) and a plurality of computing devices 104 (such as any of computing device 104-1 through computing device 104-B). In exemplary embodiments, the plurality of network nodes 102 are communicatively coupled to each other in a peer-to-peer network. In exemplary embodiments, the plurality of computing devices 104 are each communicatively coupled to at least one of the plurality of network nodes 102. In exemplary embodiments, a first subset of computing device 104 are each configured to transmit a market trade request to at least one of the plurality of network nodes 102. In exemplary embodiments, the plurality of computing devices 104 includes at least two of the plurality of computing devices, such that a first market trade request comes from a first computing device 104 and a second market trade request comes from a second computing device.

Decentralized trading system 100C includes similar components to decentralized trading system 100A and operates according to similar principles and methods as decentralized trading system 100A described above. The differences between decentralized trading system 100C and decentralized trading system 100A are that the second subset of network nodes 102 is mutually exclusive from the first subset 106-1 of network nodes 102, rather than the second subset of network nodes 102 being identical to the first subset 106-1 of network nodes (second subset 106-1) as with decentralized trading system 100A. In exemplary embodiments, the first subset 106-1 of network nodes 102 are each configured to determine an order of receipt of the plurality of market trade requests received from the plurality of computing devices 104. In exemplary embodiments, the first subset 106-1 of network nodes 102 (including at least two of the plurality of network nodes) is configured to reach a consensus of the order of receipt of the plurality of market trade requests. In exemplary embodiments, the first subset 106-1 of network nodes 102 are each configured to generate ordered data based on the order of receipt agreed upon by the first subset of network nodes. In exemplary embodiments, the second subset 106-2 of network nodes 102 (including at least two of the plurality of nodes) are configured to match the plurality of market trade requests.

Figure 2A:
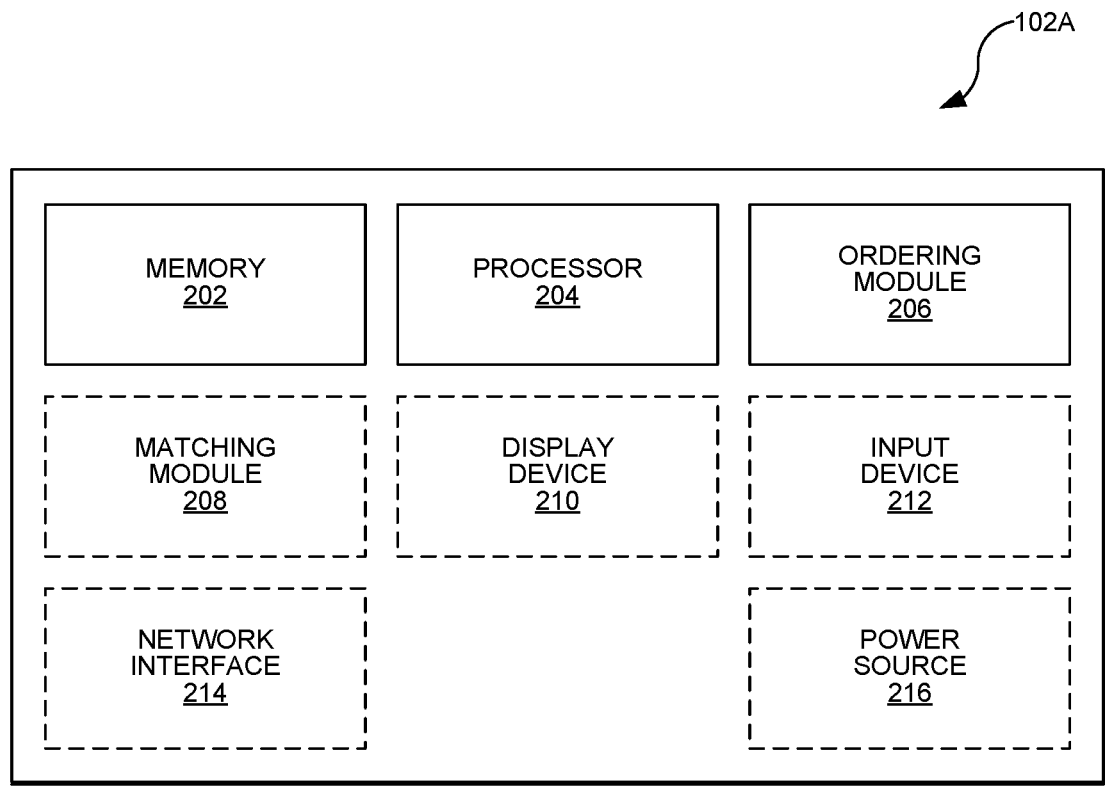
FIGS. 2A-2C are block diagrams of exemplary embodiments of a network node within a decentralized trading system, such as any of the decentralized trading systems shown in FIGS. 1A-1C.
Figure 2B:
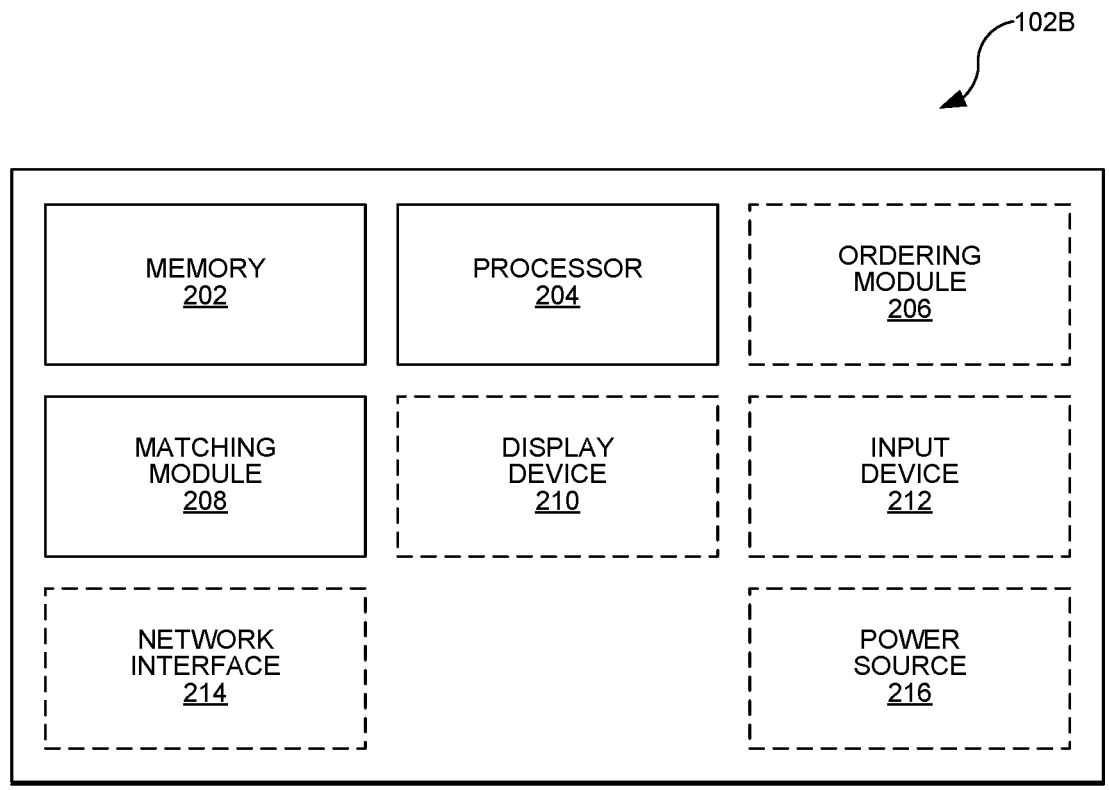
Figure 2C:
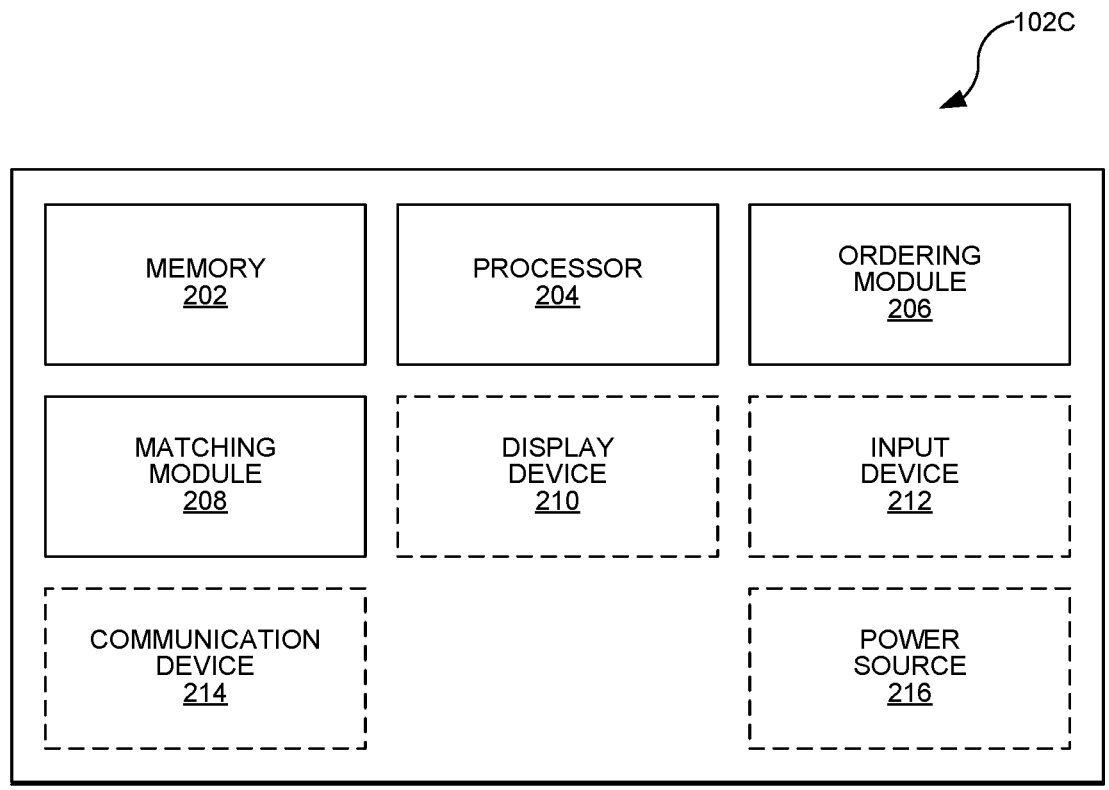

FIGS. 2A-2C are block diagrams of exemplary embodiments of a network node 102 within a decentralized trading system 100, such as any of decentralized trading systems 100A-100C described above. Each of FIGS. 2A-2C illustrates a different embodiment of a network node 102, labeled 102A-102C respectively.

FIG. 2A is a block diagram of an exemplary embodiment of a network node 102A used within a decentralized trading system 100 for fair ordering and matching of trades received at multiple network nodes 102 and matched by multiple network nodes 102. Network node 102A includes at least one memory 202, at least one processor 204, at least one ordering module 206, an optional at least one matching module 208, an optional at least one display device 210, an optional at least one input device 212, an optional network interface 214, and an optional power source 216.

In exemplary embodiments, the at least one memory 202 can be any device, mechanism, or populated data structure used for storing information. In exemplary embodiments, the at least one memory 202 can be or include any type of volatile memory, nonvolatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more embodiments to house all or some of the instructions needed to execute the functionality of the at least one ordering module 206 and/or the optional at least one matching module 208.

In exemplary embodiments, the at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In exemplary embodiments, the at least one ordering module 206 is implemented by the at least one processor 204 and the at least one memory 202.

In exemplary embodiments, the optional at least one display device 210 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In exemplary embodiments, the optional at least one input device 212 include at least one of a touchscreen (including capacitive and resistive touchscreens), a touchpad, a capacitive button, a mechanical button, a switch, a dial, a keyboard, a mouse, a camera, a biometric sensor/scanner, etc. In exemplary embodiments, the optional at least one display device 210 and the optional at least one input device 212 are combined into a human machine interface (HMI) for user interaction with the computing device 104.

In exemplary embodiments, the at least one optional network interface 214 includes or is coupled to at least one optional antenna for communication with a network. In exemplary embodiments, the at least one optional network interface 214 includes at least one of an Ethernet interface, a cellular radio access technology (RAT) radio, a WiFi radio, a Bluetooth radio, or a near field communication (NFC) radio. In exemplary embodiments, the at least one optional network interface 214 includes a cellular radio access technology radio configured to establish a cellular data connection (mobile internet) of sufficient speeds with a remote server using a local area network (LAN) or a wide area network (WAN). In exemplary embodiments, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In exemplary embodiments, the at least one optional network interface 214 includes a WiFi (IEEE 402.11) radio configured to communicate with a wireless local area network that communicates with the remote server, rather than a wide area network. In exemplary embodiments, the at least one optional network interface 214 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In exemplary embodiments, the same at least one optional network interface 214 is also used for communication with an external gateway device to a network (such as an NFC payment terminal).

In exemplary embodiments, at least one optional power source 216 is used to provide power to the various components of the network node 102.

Each network node 102A participating in the ordering of market trade requests is configured to order a plurality of market trade requests received from a plurality of computing devices 104 based on data regarding each market trade request to be ordered that is received at a plurality of network nodes 102 from a plurality of computing devices 104. In exemplary each network node 102A participating in the ordering of market trade requests is configured to use gossip between other network nodes 102A participating in the ordering of market trade requests to gather data regarding market trade requests received at any of the network nodes 102. In exemplary embodiments, this includes sending data to and receiving data from other network nodes 102 within the decentralized trading system 100. In exemplary embodiments, each network node 102A participating in the ordering of market trade requests generates ordered data based on the order it determined for the plurality of market trade requests. In exemplary embodiments, network nodes 102A participating in the ordering of the market trade requests verify the ordered data with other network nodes 102A participating in the ordering of the market trade requests. In exemplary embodiments, the at least one ordering module 206 (implemented using the at least one processor 204) implements the ordering.

Each network node 102A participating in the matching of market trade requests (such as a network node 102A implementing at least one matching module 208) is configured to match the ordered market trade requests (ordered in a single order consistent for each of the plurality of network nodes) with each other. Because the network nodes 102A participating in the ordering reached a consensus of the order, any of the network nodes 102A participating in the ordering can provide the ordered data to network nodes 102A participating in the matching. Each network node 102A participating in the matching can match the market trade requests and execute trades accordingly. Because the order was reached by consensus, the matching should be identical at each of the plurality of network nodes 102A participating in the matching. The matching determined by the network nodes 102A participating in the matching can be compared between network nodes 102A to validate the validity of the matching performed at the plurality of distributed network nodes 102.

FIG. 2B is a block diagram of an exemplary embodiment of a network node 102B used within a decentralized trading system 100 for fair ordering and matching of trades received at multiple network nodes 102 and matched by multiple network nodes 102. Network node 102B includes at least one memory 202, at least one processor 204, an optional at least one ordering module 206, at least one matching module 208, an optional at least one display device 210, an optional at least one input device 212, an optional network interface 214, and an optional power source 216. Network node 102B includes similar components to network node 102A and operates according to similar principles and methods as network node 102A described above. The differences between network node 102B and network node 102A are that the at least one ordering module 206 is optional in network node 102B and that the matching module 208 is not optional in network node 102B, such that network node 102B performs matching functions and optionally ordering functions.

FIG. 2C is a block diagram of an exemplary embodiment of a network node 102C used within a decentralized trading system 100 for fair ordering and matching of trades received at multiple network nodes 102 and matched by multiple network nodes 102. Network node 102C includes at least one memory 202, at least one processor 204, at least one ordering module 206, at least one matching module 208, an optional at least one display device 210, an optional at least one input device 212, an optional network interface 214, and an optional power source 216. Network node 102C includes similar components to network node 102A and operates according to similar principles and methods as network node 102A described above. The differences between network node 102C and network node 102A are that the matching module 208 is not optional in network node 102C, such that network node 102C performs both ordering and matching functions.

Figure 3:
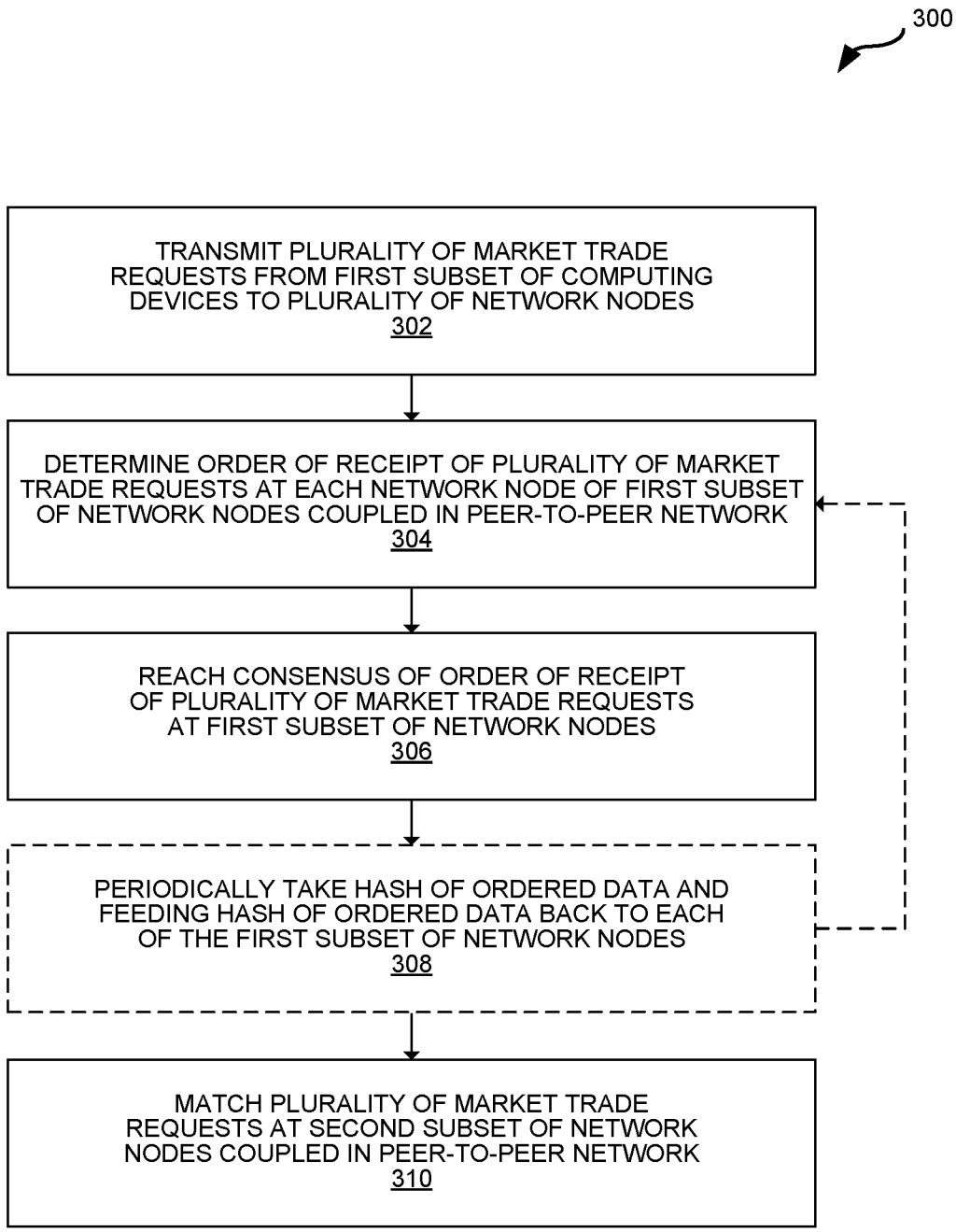
FIG. 3 is a flow diagram of an exemplary method for fair ordering and matching of trades received at multiple network nodes and matched by multiple network nodes within a decentralized trading system.

FIG. 3 is a flow diagram of an exemplary method 300 for fair ordering and matching of trades received at multiple network nodes (such as a subset 106 of network nodes 102) and matched by multiple network nodes (such as a subset 106 of network nodes 102) within a decentralized trading system (such as decentralized trading system 100). Exemplary method 300 begins at block 302 with transmitting a plurality of market trade requests from the plurality of computing devices to a plurality of network nodes. Exemplary method 300 proceeds to block 304 with determining an order of receipt of the plurality of market trade requests at a first subset of network nodes. The first subset of nodes includes at least two of the plurality of network nodes coupled in a peer-to-peer network.

Exemplary method 300 proceeds to block 306 with reaching consensus of the order of receipt of the plurality of market trade requests at the first subset of network nodes. Exemplary method 300 proceeds to block 308 with matching the plurality of market trade requests at a second subset of network nodes. The second subset of network nodes includes at least two of the plurality of network nodes communicatively coupled in the peer-to-peer network. In exemplary embodiments, the first subset of network nodes and the second subset of network nodes include an overlapping group of the plurality of network nodes. In exemplary embodiments, the first subset of network nodes and the second subset of network nodes are mutually exclusive. In exemplary embodiments, the first subset of network nodes and the second subset of network nodes are an identical subset of network nodes of the plurality of network nodes.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 4:
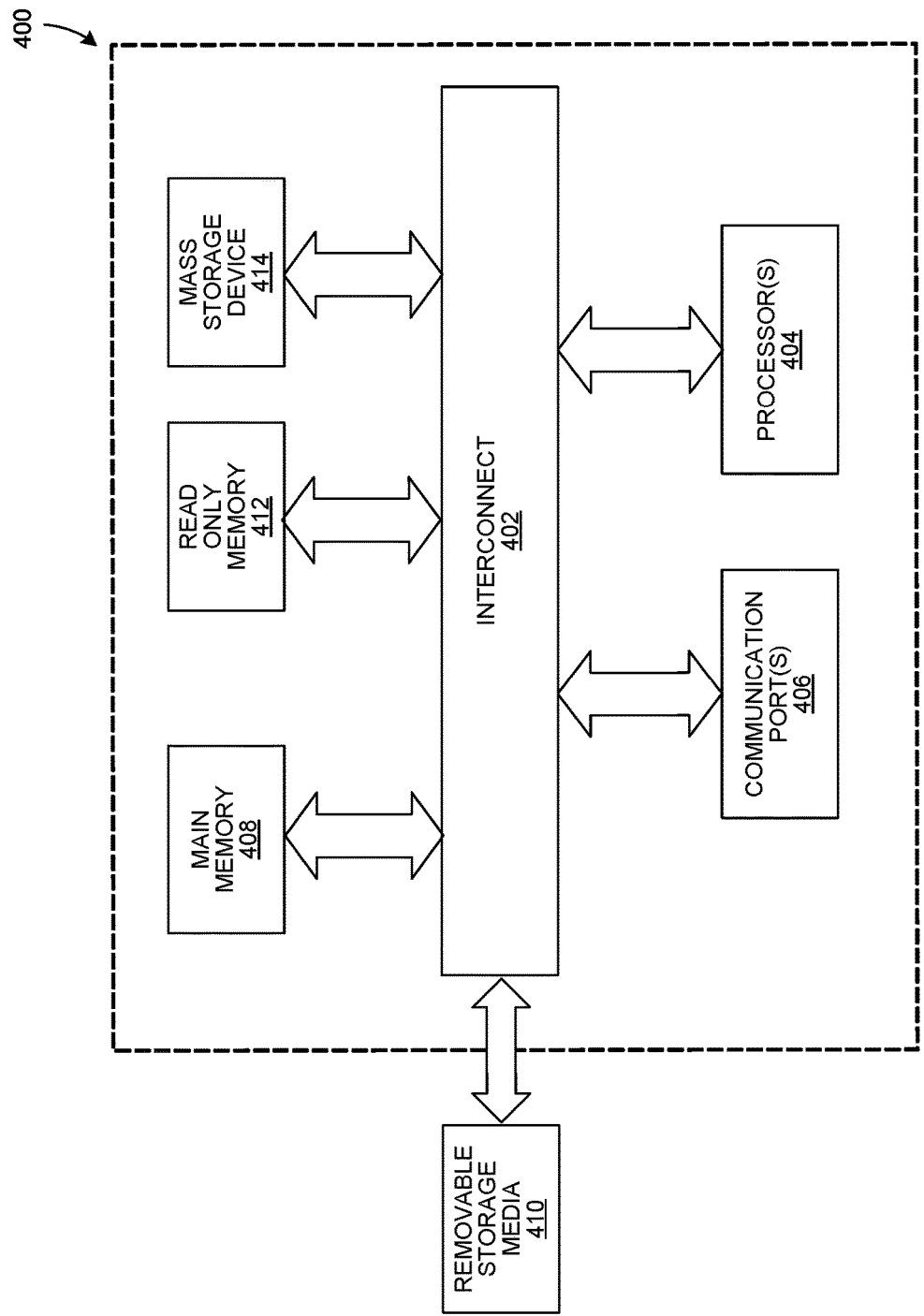
FIG. 4 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 4 is an example of a computer system 400 with which embodiments of the present disclosure may be utilized. According to the present example, the computer system 400 includes an interconnect 402, at least one processor 404, at least one communication port 406, at least one main memory 408, at least one removable storage media 410, at least one read only memory 412, and at least one mass storage device 414.

The at least one processor 404 can be any known processor. The at least one communication port 406 can be or include, for example, any of an RS-232 port for use with a modem-based dialup connection, a 10/100 Ethernet port, or a Gigabit port using copper or fiber. The nature of the at least one communication port 406 may be chosen depending on a network such a Local Area Network (LAN), Wide Area Network (WAN), or any network to which the computer system 400 connects. The at least one main memory 408 can be Random Access Memory (RAM), or any other dynamic storage device(s) commonly known in the art. The at least one read only memory 412 can be any static storage device(s) such as Programmable Read Only Memory (PROM) chips for storing static information such as instructions for the at least one processor 80.

The at least one mass storage device 414 can be used to store information and instructions. For example, hard disks such as the Adaptec® family of SCSI drives, an optical disc, an array of disks such as RAID, such as the Adaptec family of RAID drives, or any other mass storage devices may be used. Interconnect 402 can be or include one or more buses, bridges, controllers, adapters, and/or point-to-point connections. Interconnect 402 communicatively couples the at least one processor 404 with the other memory, storage, and communication blocks. Interconnect 402 can be a PCI/PCI-X or SCSI based system bus depending on the storage devices used. The at least one removable storage media 410 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component.

Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for creating, redeeming, and trading multiple security assets. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system comprising: a plurality of network nodes communicatively coupled in a peer-to-peer network; a plurality of computing devices each communicatively coupled to at least one of the plurality of network nodes; wherein the plurality of computing devices are configured to transmit a plurality of market trade requests to at least one of the plurality of network nodes; wherein a first subset of network nodes are each configured to each determine an order of receipt of the plurality of market trade requests, wherein the first subset of network nodes includes at least two of the plurality of network nodes; wherein the first subset of network nodes are configured to reach a consensus of the order of receipt of the plurality of market trade requests; wherein the first subset of network nodes are each configured to generate ordered data based on the order of receipt agreed upon by the first subset of network nodes; and wherein a second subset of network nodes are configured to match the plurality of market trade requests, wherein the second subset of network nodes includes at least two of the plurality of network nodes.

Example 2 includes the system of Example 1, wherein the first subset of network nodes are further configured to each periodically take a hash of the ordered data and to feed the hash of the ordered data back to each of the first subset of network nodes to be included in the ordered data with the plurality of market trade requests to further verify the order of the receipt of the ordered data.

Example 3 includes the system of any of Examples 1-2, wherein the first subset of network nodes are configured to reach a consensus of the order of receipt of the plurality of market trade requests using at least one Hashgraph.

Example 4 includes the system of any of Examples 1-3, wherein the first subset of network nodes are each configured to generate ordered data based on the order of receipt agreed upon by the first subset of network nodes by being configured to: perform a first hashing function on each of a first subset of the plurality of market trade requests within a first time frame representing a first reference level segment to generate a hash; and generating a first reference level segment hash for the first subset of the plurality of market trade requests within the first time frame representing the first reference level segment by performing a second hashing function on the hashes of each of the first subset of the plurality of market trade requests generated by the first hashing function according to the order of receipt of the plurality of market trade requests.

Example 5 includes the system of Example 4, further comprising: generating a second reference level segment hash for each of multiple second level segments, wherein each of the multiple second reference level segments is comprised of a predetermined number of the first reference level segments, wherein Example 6 includes the system of any of Examples 1-5, wherein the ordered data based is ordered using timestamps.

Example 7 includes the system of any of Examples 1-6, wherein the first subset of network nodes and the second subset of network nodes include an overlapping group of the plurality of network nodes.

Example 8 includes the system of any of Examples 1-7, wherein the first subset of network nodes and the second subset of network nodes are mutually exclusive.

Example 9 includes the system of any of Examples 1-8, wherein the first subset of network nodes and the second subset of network nodes are an identical subset of network nodes of the plurality of network nodes.

Example 10 includes the system of any of Examples 1-9, wherein the plurality of computing devices are selected from at least one of servers, personal computers, laptop computers, tablet computers, or smart phones.

Example 11 includes the system of any of Examples 1-10, wherein the plurality of network nodes are geographically distributed across the world.

Example 12 includes the system of any of Examples 1-11, wherein the plurality of network nodes are communicatively coupled using at least one of at least one wired network or at least one wireless network.

Example 13 includes the system of any of Examples 1-12, wherein the plurality of network nodes are communicatively coupled over at least one of at least one local area network, at least one wide area network, or the Internet.

Example 14 includes a method comprising: transmitting a plurality of market trade requests from the plurality of computing devices to at least one of a plurality of network nodes, wherein the subset of computing devices includes at least two of a plurality of computing devices; determining an order of receipt of the plurality of market trade requests at a first subset of network nodes, wherein the first subset of network nodes includes at least two of a plurality of network nodes communicatively coupled in a peer-to-peer network; reaching consensus of the order of receipt of the plurality of market trade requests at the first subset of network nodes; and matching the plurality of market trade requests at a second subset of network nodes, wherein the second subset of network nodes includes at least two of the plurality of network nodes communicatively coupled in the peer-to-peer network.

Example 15 includes the method of Example 14, further comprising: periodically taking a hash of the ordered data; feeding the hash of the ordered data back to each of the first subset of network nodes; and wherein determining the order of receipt of the plurality of market trade requests includes determining an order of receipt of the hash of the ordered data along with the plurality of market trade requests.

Example 16 includes the method of any of Examples 14-15, wherein reaching consensus of the order of receipt of the plurality of market trade requests occurs using at least one Hashgraph.

Example 17 includes the method of any of Examples 14-16, wherein the ordered data based is ordered using timestamps.

Example 18 includes the method of any of Examples 14-17, wherein the first subset of network nodes and the second subset of network nodes include an overlapping group of the plurality of network nodes.

Example 19 includes the method of any of Examples 14-18, wherein the first subset of network nodes and the second subset of network nodes are mutually exclusive.

Example 20 includes the method of any of Examples 14-19, wherein the first subset of network nodes and the second subset of network nodes are an identical subset of network nodes of the plurality of network nodes.

Example 21 includes the method of any of Examples 14-20, wherein the plurality of computing devices are selected from at least one of servers, personal computers, laptop computers, tablet computers, or smart phones.

Example 22 includes the method of any of Examples 14-21, wherein the plurality of network nodes are geographically distributed across the world.

Example 23 includes the method of any of Examples 14-22, wherein the plurality of network nodes are communicatively coupled using at least one of at least one wired network or at least one wireless network.

Example 24 includes the method of any of Examples 14-23, wherein the plurality of network nodes are communicatively coupled over at least one of at least one local area network, at least one wide area network, or the Internet.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A system comprising:
a plurality of network nodes communicatively coupled in a geographically distributed peer-to-peer network, wherein peer-to-peer connections within the geographically distributed peer-to-peer network have different delays along different data pathways between the plurality of network nodes;
a plurality of computing devices each communicatively coupled to at least one of the plurality of network nodes;
wherein a first computing device of the plurality of computing devices is configured to transmit a first market trade request to a first network node of the plurality of network nodes, wherein the first market trade request includes at least one of a first buy order or a first sell order for a first asset;
wherein a second computing device of the plurality of computing devices is configured to transmit a second market trade request to a second network node of the plurality of network nodes, wherein the second market trade request includes at least one of a second buy order or a second sell order for a second asset;
wherein at least some network nodes of the plurality of network nodes are configured to distribute information relating to times at which a plurality of market trade requests are received to other network nodes of the plurality of network nodes using a common time base within the plurality of network nodes, wherein the plurality of market trade requests includes the first market trade request and the second market trade request;
wherein a first subset of network nodes of the plurality of network nodes are each configured to determine an order of receipt of the plurality of market trade requests using the information relating to the times at which the plurality of market trade requests are received by the plurality of network nodes, wherein the first subset of network nodes includes at least two of the plurality of network nodes;
wherein the first subset of network nodes are configured to reach a consensus of the order of receipt of the plurality of market trade requests using the information relating to the times at which the plurality of market trade requests are received by the plurality of network nodes;
wherein the first subset of network nodes are each configured to generate ordered data based on the order of receipt of the plurality of market trade requests agreed upon by the first subset of network nodes, wherein a common ordering of the plurality of market trade requests in the ordered data generated by each of the first subset of network nodes matches the ordered data generated by each of the other network nodes of the first subset of network nodes because the consensus of the order of receipt of the plurality of market trade requests was first reached by the first subset of network nodes; and
wherein a second subset of network nodes are each configured to implement individual matching engines configured to match the plurality of market trade requests using the common ordering of the plurality of market trade requests in the ordered data, which results in execution of trade requests at each of the second subset of network nodes in a single order consistent between each of the second subset of network nodes, wherein the second subset of network nodes includes at least two of the plurality of network nodes.

2. The system of claim 1, wherein the first subset of network nodes are further configured to each periodically take a hash of the ordered data and to feed the hash of the ordered data back to each of the first subset of network nodes to be included in the ordered data with the plurality of market trade requests to further verify the order of the receipt of the ordered data.

3. The system of claim 1, wherein the first subset of network nodes are configured to reach the consensus of the order of receipt of the plurality of market trade requests using at least one Hashgraph.

4. The system of claim 1, wherein the first subset of network nodes are each configured to generate ordered data based on the order of receipt of the plurality of market trade requests agreed upon by the first subset of network nodes by being configured to:
perform a first hashing function on each of a first subset of the plurality of market trade requests within a first time frame representing a first reference level segment to generate a hash; and
generating a first reference level segment hash for the first subset of the plurality of market trade requests within the first time frame representing the first reference level segment by performing a second hashing function on the hash of each of the first subset of the plurality of market trade requests generated by the first hashing function according to the order of receipt of the plurality of market trade requests.

5. The system of claim 4, further comprising:
generating a second reference level segment hash for each of a plurality of second reference level segments, wherein each of the plurality of second reference level segments is comprised of a predetermined number of first reference level segments.

6. The system of claim 1, wherein the ordered data is ordered using timestamps.

7. The system of claim 1, wherein the first subset of network nodes and the second subset of network nodes include an overlapping group of the plurality of network nodes.

8. The system of claim 1, wherein the first subset of network nodes and the second subset of network nodes are mutually exclusive.

9. The system of claim 1, wherein the first subset of network nodes and the second subset of network nodes are an identical subset of network nodes of the plurality of network nodes.

10. The system of claim 1, wherein the plurality of computing devices are selected from at least one of servers, personal computers, laptop computers, tablet computers, or smart phones.

11. The system of claim 1, wherein the first asset and the second asset include at least one of securities, bonds, currencies, funds, exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds.

12. The system of claim 1, wherein the plurality of network nodes are communicatively coupled using at least one of at least one wired network or at least one wireless network.

13. The system of claim 1, wherein the plurality of network nodes are communicatively coupled over at least one of at least one local area network, at least one wide area network, or the Internet.

14. A method comprising:
transmitting a first market trade request from a first computing device of a plurality of computing devices to a first network node of a plurality of network nodes communicatively coupled in a geographically distributed peer-to-peer network, wherein the first market trade request includes at least one of a first buy order or a first sell order for a first asset, wherein peer-to-peer connections within the geographically distributed peer-to-peer network have different delays along different data pathways between the plurality of network nodes;
transmitting a second market trade request from a second computing device of the plurality of computing devices to a second network node of the plurality of network nodes, wherein the second market trade request includes at least one of a second buy order or a second sell order for a second asset;
distributing information relating to times at which a plurality of market trade requests are received from at least some network nodes of the plurality of network nodes to other network nodes of the plurality of network nodes using a common time base within the plurality of network nodes, wherein the plurality of market trade requests includes the first market trade request and the second market trade request;
determining an order of receipt of the plurality of market trade requests at each of a first subset of network nodes of the plurality of network nodes using the information relating to the times at which the plurality of market trade requests using the information relating to the times at which the plurality of market trade requests are received by the plurality of network nodes, wherein the first subset of network nodes includes at least two of the plurality of network nodes;
reaching consensus of the order of receipt of the plurality of market trade requests at the first subset of network nodes using the information relating to the times at which the plurality of market trade requests are received by the plurality of network nodes;
generating ordered data at each of the first subset of network nodes based on the order of receipt of the plurality of market trade requests agreed upon by the first subset of network nodes, wherein a common ordering of the plurality of market trade requests in the ordered data generated by each of the first subset of network nodes matches the ordered data generated by each of the other network nodes of the first subset of network nodes because the consensus of the order of receipt of the plurality of market trade requests was first reached by the first subset of network nodes; and
matching the plurality of market trade requests using individual matching engines at each of a second subset of network nodes using the common ordering of the plurality of market trade requests in the ordered data, which results in execution of trade requests at each of the second subset of network nodes in a single order consistent between each of the second subset of network nodes, wherein the second subset of network nodes includes at least two of the plurality of network nodes.

15. The method of claim 14, further comprising:
periodically taking a hash of the ordered data at each of the first subset of network nodes;
feeding the hash of the ordered data back to each of the first subset of network nodes; and
wherein determining the order of receipt of the plurality of market trade requests at each of the first subset of network nodes of the plurality of network nodes includes determining an order of receipt of the hash of the ordered data along with the plurality of market trade requests.

16. The method of claim 14, wherein reaching consensus of the order of receipt of the plurality of market trade requests occurs using at least one Hashgraph.

17. The method of claim 14, wherein the ordered data is ordered using timestamps.

18. The method of claim 14, wherein the first subset of network nodes and the second subset of network nodes include an overlapping group of the plurality of network nodes.

19. The method of claim 14, wherein the first subset of network nodes and the second subset of network nodes are mutually exclusive.

20. The method of claim 14, wherein the first subset of network nodes and the second subset of network nodes are an identical subset of network nodes of the plurality of network nodes.

21. The method of claim 14, wherein the plurality of computing devices are selected from at least one of servers, personal computers, laptop computers, tablet computers, or smart phones.

22. The method of claim 14, wherein the first asset and the second asset include at least one of securities, bonds, currencies, funds, exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds.

23. The method of claim 14, wherein the plurality of network nodes are communicatively coupled using at least one of at least one wired network or at least one wireless network.

24. The method of claim 14, wherein the plurality of network nodes are communicatively coupled over at least one of at least one local area network, at least one wide area network, or the Internet.

* * * * *